United States Patent [19]

Brown et al.

[11] Patent Number: 4,888,117

[45] Date of Patent: Dec. 19, 1989

[54] METHOD FOR COALESCENCE

[75] Inventors: Giselle M. Brown, Yateley; Anthony S. MacFarlane, Lightwater, both of England

[73] Assignee: The British Petroleum Company p.l.c., London, England, United Kingdom

[21] Appl. No.: 196,175

[22] Filed: May 19, 1988

[30] Foreign Application Priority Data

May 20, 1987 [GB] United Kingdom ............... 8711931

[51] Int. Cl.⁴ ............................................. B01D 17/04
[52] U.S. Cl. ................................... 210/649; 210/708; 210/DIG. 5; 210/510.1
[58] Field of Search ............... 210/496, 510.1, 708, 210/799, DIG. 5, 702, 649

[56] References Cited

U.S. PATENT DOCUMENTS

| | | | |
|---|---|---|---|
| 2,359,386 | 10/1944 | Reinsch | 210/510.1 |
| 2,404,872 | 7/1946 | Walker, Jr. | 210/649 |
| 2,611,750 | 9/1952 | White | 210/496 |
| 3,016,345 | 1/1962 | Price | 210/DIG. 5 |
| 3,027,009 | 3/1962 | Price | 210/DIG. 5 |

FOREIGN PATENT DOCUMENTS

| | | |
|---|---|---|
| 254551 | 7/1987 | European Pat. Off. . |
| 5129113 | 10/1980 | Japan . |
| 831326 | 3/1960 | United Kingdom . |
| 2038652 | 7/1980 | United Kingdom . |
| 1598456 | 9/1981 | United Kingdom . |
| 2109261 | 6/1983 | United Kingdom . |
| 2182599 | 5/1987 | United Kingdom . |

OTHER PUBLICATIONS

"Porous Metal Sheet", J. Campbell, from "Materials & Methods", vol. 41, pp. 98–101, Apr. 1955.

Primary Examiner—Peter Hruskoci
Assistant Examiner—Christopher Upton
Attorney, Agent, or Firm—C. S. Lynch; D. J. Untener; L. W. Evans

[57] ABSTRACT

A method of coalescence involves the use of a coalescer element consisting essentially of or comprising a sintered polymeric media having a fine porous structure. Suitable polymers include thermoplastics or thermosetting resins.

The element is suitable for de-oiling oily water and dewatering crude oil.

8 Claims, 1 Drawing Sheet

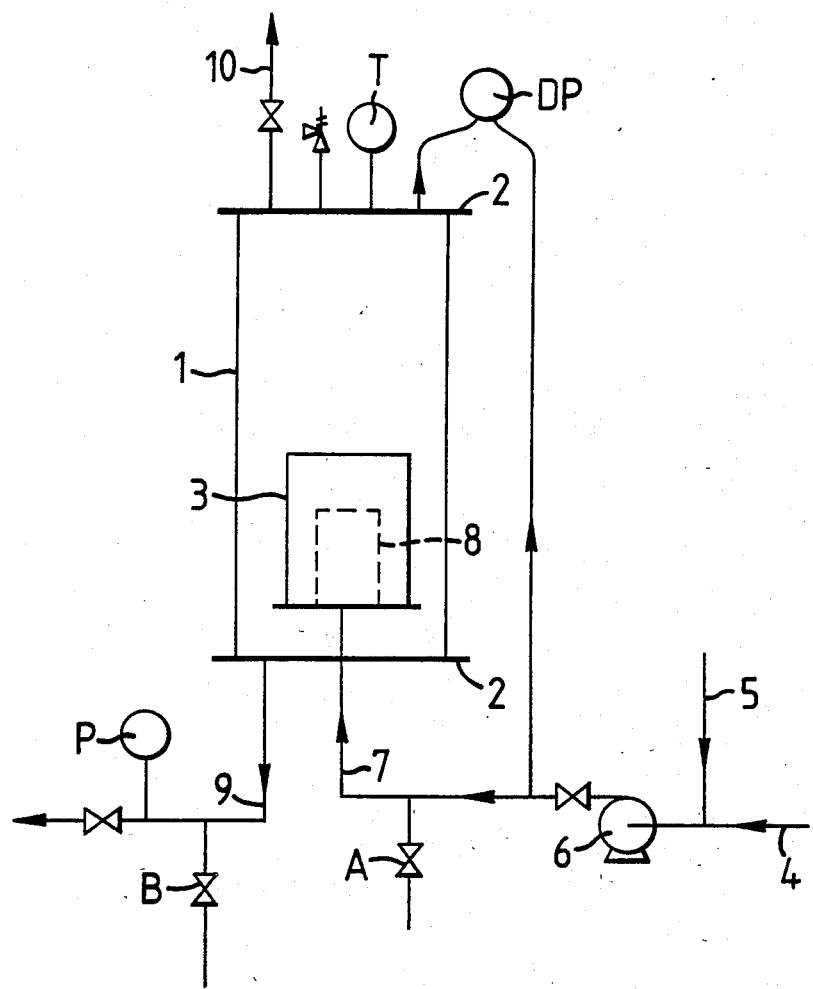

METHOD FOR COALESCENCE

This invention relates to a method for removing a finely dispersed immiscible liquid contaminant from another liquid.

In the production of crude oil from an oilfield it is usual for the oil to be co-produced with water. During the life of the oilfield the proportion of water produced with the crude oil often increases and substantial quantities can be generated. It is desirable to separate the oil from the co-produced water before transporting the oil from the wellhead either by pipeline or tanker.

The separated water so produced requires further treatment to remove oil prior to disposal.

Oil refining also produces large quantities of oil contaminated aqueous effluent which must be treated to remove oil prior to disposal. Other sources of oil contaminated water which require treatment include terminals, depots and storage facilities.

Enhanced gravity separation, using coalescence, is an established method for both oil/water and water/oil separation.

Our British patent specification No. 2 038 652 discloses one such device for this duty. This comprises two stages: pre-filtration followed by coalescence/gravity separation. In the coalescence stage droplets forming the disperse phase are increased in size to accelerate the rate of disengagement and thus reduce separator volume. Most coalescing media are easily blocked by any suspended solids present. These solids are removed in the pre-filtration state in order to extend coalescer element life.

Coalescer elements manufactured from glass fibres have, in general, proved effective with pore sizes down to 1 micrometer being possible. These, however, suffer from certain disadvantages. Glass fibre coalescer elements having limited mechanical strength and being susceptible to attack in the presence of hot alkaline water.

Our British patent specification Nos. 1,598,456 and 2,109,261 disclose coalescing elements consisting essentially of polyester and polyacrylonitrile, respectively. The elements may be in the form of woven or non-woven fabrics and are preferably made by the needle punch process. Such needle felts can be manufactured with pores down to 40–50 micron in diameter.

Treatment of finer, and therefore more difficult to resolve, dispersions requires coalescing media with pore sizes smaller than those attainable with needle felts.

We have now devised improved elements suitable for use in coalescence.

By element we mean any configuration which has the intrinsic capability of achieving coalescence.

Thus according to the present invention there is provided a method for resolving into its components a stream containing a dispersion of oil and water which method comprises passing the stream through a coalescer element consisting essentially of or comprising a sintered polymeric media having a fine porous structure, and recovering separated oil and separated water from the stream.

By fine porous structure we mean having pores in the range 1 to 100 micron.

Suitable polymeric materials include both thermoplastics such as polyethylene and polypropylene or copolymers, polyacrylonitrile, polyvinylidene fluoride and thermosetting resins such as phenol formaldehyde.

Suitable thermosetting resins are phenol formaldehyde novolak resins containing hexamine.

The thermoplastic materials may be homogeneous or admixed with organic or inorganic fillers. Suitable fillers include particulate carbon, silica, alumina, silicon carbide, or carbon or glass fibres.

These may be present at up to 50% vol/vol.

They may be used to provide additional structural strength for especially arduous conditions e.g. high temperature operations (e.g. 90°–150° C.) or to improve performance in situations where the nature of the fluids is such that coalescence on unmodified surfaces is inhibited.

By 'sintering' we mean a step which causes the individual particles of material, for example polymer or resin, to adhere together in a solid porous matrix without the need for a separately introduced binder while retaining their individual identity to a substantial extent on heating.

Using sintered materials it is possible to achieve the fine pore structures of glass fibre elements while retaining the mechanical strength and chemical resistance of needle felt.

Sintered porous media have sufficient mechanical strength to withstand backwashing without pore distortion. A backwashable coalescer would obviate the need for pre-filtration.

The elements are particularly suitable for use in the form of cylindrical cartridge coalescers in which the feedstock flows radially through the element, usually from the centre outwards.

The coalescer cartridge may be fabricated in a single block and may additionally be moulded with a threaded inlet. This replaces the need for O-ring seals present on conventional coalescers.

Such a cartridge is suitable for de-oiling oily water resulting from washing and separation processes, and dewatering crude oil. Typical oily waters contain from 5–750 mg of crude petroleum or petroleum products per Kg of water.

In general the rates of liquid flowing through the cartridge should be in the range 2–150 $m^3/m^2/hr$.

The procedure for coalescence may be illustrated with reference to the accompanying FIGURE which is a schematic drawing of a coalescer apparatus.

The coalescer apparatus consists of a QVF glass vessel 1 of dimensions, length 300 m, width 150 mm, sealed at each end by stainless steel end plates 2. The novel coalescer element 3 as described in Table 1 is mounted centrally in the bottom of the vessel.

Town water via line 4 is mixed with stablised Forties crude oil from line 5 and the mixture passed through centrifugal pump 6 to produce a dispersion of oil in water.

The oily water is passed via line 7 into the internal void space 8 of the coalescer element 3. The water radially passes through the walls of the coalescer element while the oil collects on the external surface.

Treated water is withdrawn continuously from an outlet at the bottom of the vessel through line 9.

Oil in the form of large droplets eventually rises to the top of the vessel and may be removed through line 10.

The water content may be analysed before and after treatment at sampling points A and B, respectively.

Temperature, pressure and differential pressure readings may be made at convenient points in the apparatus, indicated by T, P, and DP respectively in the FIGURE.

The coalescer vessel is operated on a continuous single pass basis and is run flooded at a slight positive pressure of about 0.034 MPa. The differential pressure across the coalescer element varies depending on the oil loading, the flux and the type of element used.

The invention is further illustrated by the following Examples. The dimensions, mode pore size and porosity of the coalescers used in the Examples are given in Table 1. Mode pore size represents the most common pore size present in the materials comprising these elements, the porosity measurements were made using Mercury porosimetry.

Example 1

A phenol formaldehyde novolak resin supplied by BP Chemicals under the designation J11011/1 containing 2.5–3% hexamine by weight and is in finely ground form 98% at less than 75 micrometres was poured into trays and cured for 2.5 hrs. at 150° C. The resulting slabs of substantially cured resin were ground in a hammer mill then sieved to give particles with a size of 180–250 micrometres. The powdered resin was then mixed with 7.5% hexamethylene tetramine, packed into a mould and subjected to sintering by heating in an oven at 150° C. for 1 hr.

A coalescer element from this material was prepared and installed in the QVF glass vessel as described above.

Town water mixed with Forties crude oil resulting in an oil content of 48 mg/l was passed through the coalescer at a feed temperature of 20° C. and at a rate of 3 m$^3$/m$^2$/hr. The treated water was examined and showed an oil content of 2 mg/l representing 96% removal.

The oil content in the water was determined by solvent extraction with 1,1,2-trichlorofluoroethane followed by infrared measurement of a sample of extract in the wavelength region 2750–3200 cm$^{-1}$ using a pre-calibrated Perkin Elmer 681 spectrometer. The oil content was calculated from the peak height at 2930 cm$^{-1}$.

Examples 2–7

Example 1 was repeated with variations in both the inlet oil concentration and throughput rates at a feed temperature of 20° C.

Examples 8–17

Experiments were carried out as in Examples 1–7 except that the resin was ground to particle size of 106–180 micrometres and the feed temperature varied between 19°–52° C.

Examples 18–21

Experiments were carried out as in Examples 1–7 except that the resin was ground to a particle size <106 micrometres.

Examples 22–23

These experiments were performed with ultra-high molecular weight polyethylene (UHMWPE), supplied by Sinterform Ltd, installed as the coalescer element in the vessel.

Examples 24–29

Examples 22–23 were repeated with polyvinylidene fluoride (PVDF), supplied by Porex Technologies, installed as the coalescer element.

Example 30

This experiment was performed without any coalescer element installed in the vessel.

The results for Examples 1–30 are given in Table 2.

COMPARATIVE EXPERIMENTS

Examples 31–37

These experiments were performed in similar apparatus using conventional coalescers comprising 178 mm polyacrylonitrile cartridge, 165 mm polyester cartridge or 0.6–1.2 mm anthracite pre-treated with a surface active agent OLOA 1200 in heptane. Inlet oil concentration and feed temperature were varied in each experiment.

The results for Examples 31–37 are given in Table 3.

Several of the inlet samples were analysed for 'soluble' oil operationally defined as the oil which passed through a 0.7 micrometer Whatman GF/F filter paper. The soluble oil content cannot be removed by conventional coalescence and has been taken into account, where measured in Examples 14–17, 26–29, in calculating the oil removal efficiencies of the coalescer elements.

TABLE 1

| MATERIAL (particle size) | DIMENSIONS mm | | | | MODE PORE SIZE μm | POROSITY % |
| --- | --- | --- | --- | --- | --- | --- |
| | Length | Depth | Outside dia. | Inside dia. | | |
| Thermosets | | | | | | |
| Phenolic resins | | | | | | |
| SAMPLE 1 (180–250 μm) | 98 | 61 | 78 | 52 | 57.5 | 44.5 |
| SAMPLE 2 (106–180 μm) | 103 | 70 | 78 | 52 | 28.3 | 42 |
| SAMPLE 3 (<106 μm) | 95 | 69 | 78 | 52 | 13.7 | 44 |
| Thermoplastics | | | | | | |
| UHMWPE | 150 | 150 | 25 | 14 | 26.7 | 59 |
| PVDF | 150 | 150 | 24.9 | 13.6 | 30.1 | 50 |

UHMWPE = ultra-high molecular weight polyethylene
PVDF = polyvinylidene fluoride

TABLE 2

| MATERIAL | Example | Inlet Oil mg/l | Outlet Oil mg/l | Soluble Oil mg/l | % Removal | Flux m³/m²/hr | Feed Temp °C |
|---|---|---|---|---|---|---|---|
| Phenolic Resins | | | | | | | |
| Sample 1 | 1 | 48 | 2 | — | 96 | 3 | 20 |
| | 2 | 56 | 2.5 | — | 96 | 3 | 20 |
| | 3 | 34 | 2.2 | — | 94 | 3 | 20 |
| | 4 | 91 | 7.8 | — | 91 | 12.3 | 20 |
| | 5 | 56 | 22 | — | 61 | 25 | 20 |
| | 6 | 232 | 27.2 | — | 88 | 18.6 | 20 |
| | 7 | 91 | 32 | — | 65 | 12.3 | 20 |
| Sample 2 | 8 | 34 | 1.4 | — | 96 | 2.8 | 20 |
| | 9 | 40 | 1.8 | — | 96 | 2.8 | 20 |
| | 10 | 23.2 | 1.8 | — | 92 | 2.8 | 20 |
| | 11 | 30 | 2.2 | — | 93 | 2.8 | 20 |
| | 12 | 96 | 4.5 | — | 95 | 8.8 | 20 |
| | 13 | 64.8 | 4.3 | — | 93 | 15 | 20 |
| | 14 | 116.8 | 1.76 | 1.3 | 99.6 | 11 | 19 |
| | 15 | 94 | 1.84 | 1.3 | 99.4 | 11 | 19 |
| | 16 | 52 | 2 | 1.5 | 98.6 | 11 | 38 |
| | 17 | 40 | 3.4 | 1.5 | 95 | 11 | 52 |
| Sample 3 | 18 | 29 | 1.7 | — | 94 | 3 | 20 |
| | 19 | 37 | 2.2 | — | 94 | 3 | 20 |
| | 20 | 87 | 1.9 | — | 98 | 11 | 20 |
| | 21 | 157 | 1.2 | — | 99 | 12 | 20 |
| Thermoplastics | | | | | | | |
| UHMWPE | 22 | 65.3 | 22.4 | — | 66 | 14 | 20 |
| | 23 | 48.8 | 16.4 | — | 66 | 8.6 | 20 |
| PVDF | 24 | 78.6 | 10.7 | — | 86 | 20.6 | 20 |
| | 25 | 56 | 9.1 | — | 84 | 7.8 | 20 |
| | 26 | 57 | 11.5 | 1.5 | 82 | 18 | 24.5 |
| | 27 | 24 | 2.8 | 1.04 | 93 | 18 | 40 |
| | 28 | 65 | 5.6 | 2.16 | 94 | 17 | 57 |
| | 29 | 60 | 7.7 | 1.7 | 90 | 17 | 69 |
| No coalescer | 30 | 50 | 49 | — | — | 3 | 20 |

TABLE 3

| COALESCER | Example | Inlet Oil mg/l | Outlet Oil mg/l | % Removal | Flux m³/m²/hr | Feed Temp °C |
|---|---|---|---|---|---|---|
| 178 mm Polyacrylonitrile cartridge (nominal pore size) 40-50 μm | 31 | 183 | 13.5 | 92.8 | 12 | 55 |
| | 32 | 201 | 10.3 | 94.9 | 12 | 55 |
| | 33 | 225 | 14.4 | 93.6 | 12 | 55 |
| 165 mm Polyester cartridge (nominal pore size) 40-50 μm | 34 | 153 | 3.4 | 97.7 | 12 | 42 |
| | 35 | 111 | 4.0 | 97.7 | 12 | 42 |
| Anthracite 0.6-1.2 mm (pre-treated with OLOA 1200 in heptane) | 36 | 260 | 39 | 85 | 24 | 62 |
| | 37 | 275 | 38 | 86 | 24 | 60 |

What we claim is:

1. A method for resolving into its components a stream containing a dispersion of oil and water which method comprises the step of coalescence and gravity separation of said oil by passing the stream through a coalescer element comprising a sintered polymeric media having a fine porous structure and containing pores in the range of 1 to 100 microns and recovering separated oil and separated water from the stream.

2. A method according to claim 1 wherein the sintered polymeric media is a thermosetting resin.

3. A method according to claim 2 wherein the thermosetting resin is a phenolic resin.

4. A method according to claim 1 wherein the sintered polymeric media is a thermoplastic.

5. A method according to claim 4 wherein a particulate material chosen from carbon, silica, silicon carbide or alumina is present as a filler admixed with said polymeric media.

6. A method according to claim 4 wherein a fibrous material chosen from carbon or glass is present as a filler admixed with said polymeric media.

7. A method of claim 4 wherein the thermoplastic is selected from polyacrylonitrile, polyvinylidene fluoride, homopolymers and copolymers of ethylene, and homopolymers and copolymers of propylene.

8. A method according to claim 1 wherein the coalescer element is in the form of a cylindrical cartridge.

* * * * *